(12) United States Patent
Shindo et al.

(10) Patent No.: US 12,264,968 B2
(45) Date of Patent: Apr. 1, 2025

(54) NON-TRANSITORY COMPUTER-READABLE STORAGE MEDIUM STORING COLORIMETRIC APPLICATION PROGRAM, COLORIMETRIC SYSTEM, INFORMATION PROCESSING APPARATUS, COLORIMETER, AND METHOD OF CONTROLLING THE SAME

(71) Applicant: CANON KABUSHIKI KAISHA, Tokyo (JP)

(72) Inventors: Yukihiro Shindo, Chiba (JP); Hidekazu Nakashio, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 127 days.

(21) Appl. No.: 17/884,843

(22) Filed: Aug. 10, 2022

(65) Prior Publication Data

US 2023/0061166 A1 Mar. 2, 2023

(30) Foreign Application Priority Data

Aug. 25, 2021 (JP) .................. 2021-137369
Apr. 15, 2022 (JP) .................. 2022-067817

(51) Int. Cl.
*G01J 3/46* (2006.01)
*G01J 3/50* (2006.01)
*G01J 3/52* (2006.01)

(52) U.S. Cl.
CPC ............ *G01J 3/524* (2013.01); *G01J 3/501* (2013.01)

(58) Field of Classification Search
CPC .................. G01J 3/524; G01J 3/501
USPC .................. 702/85; 709/228, 227
See application file for complete search history.

(56) References Cited

U.S. PATENT DOCUMENTS

| 6,459,425 B1* | 10/2002 | Holub | G01J 3/0224 |
| | | | 348/253 |
| 11,150,136 B2 | 10/2021 | Inada | |
| 2009/0021737 A1* | 1/2009 | Halford | G01J 3/462 |
| | | | 356/402 |
| 2011/0299101 A1* | 12/2011 | Namikata | H04N 1/6097 |
| | | | 358/1.9 |
| 2022/0268630 A1* | 8/2022 | Kobayashi | G01J 3/0264 |

FOREIGN PATENT DOCUMENTS

| JP | 2020030754 A | 2/2020 | |
| WO | WO-2010021258 A1 * | 2/2010 | ............ G01J 3/02 |

* cited by examiner

*Primary Examiner* — Jamares Q Washington
(74) *Attorney, Agent, or Firm* — ROSSI, KIMMS & McDOWELL LLP

(57) ABSTRACT

An information processing apparatus operable to perform colorimetry using a colorimeter that performs colorimetry of a colorimetric target based on reflected light obtained by irradiating illumination light onto the colorimetric target. The information processing apparatus loads a control program of a connected colorimeter before confirming a colorimeter to be used for colorimetry, executes the control program and receives an operation event of an operation performed on the connected colorimeter, and in response to the operation event, controls so as to confirm the colorimeter as a colorimeter to be used, or cause the colorimeter to wait until usage preparation, or confirm the colorimeter as a colorimeter to be used and request execution of calibration.

21 Claims, 10 Drawing Sheets

NON-TRANSITORY COMPUTER-READABLE STORAGE MEDIUM STORING COLORIMETRIC APPLICATION PROGRAM, COLORIMETRIC SYSTEM, INFORMATION PROCESSING APPARATUS, COLORIMETER, AND METHOD OF CONTROLLING THE SAME

BACKGROUND OF THE INVENTION

Field of the Invention

The present invention relates to a non-transitory computer-readable storage medium storing a colorimetric application program, a colorimetric system, an information processing apparatus, a colorimeter, and a method of controlling the same.

Description of the Related Art

In order to maintain the quality of print products, companies that produce color print products, such as printing companies, regularly measure the colors of print products and, based on such colorimetry results, perform color adjustment of printing apparatuses on which the print products have been printed. In such color adjustment of a printing apparatus, for example, original image data called a color chart is printed by a printing apparatus, and colors of respective patches on a printed color chart, are measured by a colorimeter. Then, the amount of color misalignment between a measured value of the color of each patch and a target value of the color of the patch is evaluated, and the color adjustment of the printing apparatus is performed according to a result of that evaluation.

In addition, although colors printed by printing apparatuses have conventionally been managed according to sample chart colors and workers' senses, colorimeters have become increasingly used for more accurate management. Under such circumstances, it has become important to reduce the burden of colorimetric work for color management on workers. For example, Japanese Patent Laid-Open No. 2020-30754 discloses a technique for reducing the burden of a connection operation by directly connecting a handheld colorimeter to a user terminal or cloud server.

However, in order to simplify such a colorimeter connection operation, it is necessary to perform control for connecting to a network by holding account information and the like on a colorimeter side, which increases the risk of information leakage by the colorimeter. Further, since it is difficult for a colorimeter alone to appropriately perform colorimetric work, it is necessary to perform the work while confirming conditions for colorimetry and the like on a screen by running a colorimetric application program on a user terminal.

Rather than having the colorimeter hold information for which there is a concern for a risk of information leakage, a colorimetric application program is used, which leads to an increase in the burden on colorimetry workers. Therefore, there is a need for reducing that burden. When executing a colorimetric application program, a worker uses a pointing device to perform operations, such as selection and confirmation of a handheld colorimeter to be used and transition to a standby state in which it becomes possible to use the handheld colorimeter. Then, the worker switches from the pointing device to the handheld colorimeter and operates a button on the handheld colorimeter to instruct execution of colorimeter calibration, colorimetry of printing patches, and the like. In this case, operation using the pointing device, from execution of the colorimetric application program up until when the work with the handheld colorimeter is started, is complicated. For example, when a pointing device and a handheld colorimeter are alternately used on the same desk, operation of the pointing device interferes with the operational traffic lines of the handheld colorimeter, which results in a burden on a colorimetry worker.

SUMMARY OF THE INVENTION

An aspect of the present invention is to eliminate the above-mentioned problem with conventional technology.

A feature of the present invention is to provide a technique for enabling ease of colorimetric work that utilizes a colorimeter by reducing burden on a colorimetry worker.

According to a first aspect of the present invention, there is provided an information processing apparatus operable to perform colorimetry using a colorimeter configured to perform colorimetry of a colorimetric target based on reflected light obtained by applying illumination light onto the colorimetric target, the apparatus comprising: one or more memories storing instructions; and one or more processors that execute the instructions being configured to: load a control program of a connected colorimeter before confirming a colorimeter to be used for colorimetry; execute the control program and receive an operation event of an operation performed on the connected colorimeter; and in response to the operation event, control so as to confirm the colorimeter as a colorimeter to be used, or cause the colorimeter to wait until usage preparation, or confirm the colorimeter as a colorimeter to be used and request execution of calibration.

According to a second aspect of the present invention, there is provided a non-transitory computer-readable storage medium storing a colorimetric application program to be executed by an information processing apparatus, the colorimetric application program causing a processor to execute: a load process of loading to the information processing apparatus a control program of a colorimeter connected to the information processing apparatus, before confirming a colorimeter to be used for colorimetry; a reception process of receiving an operation event of an operation performed on the colorimeter connected to the information processing apparatus; and a control process of controlling so as to, in response to the operation event, confirm the colorimeter as a colorimeter to be used, or cause the colorimeter to wait until usage preparation, or confirm the colorimeter as a colorimeter to be used and request execution of calibration.

According to a third aspect of the present invention, there is provided a colorimeter operable to perform colorimetry on a colorimetric target based on reflected light obtained by irradiating illumination light on the colorimetric target, the colorimeter comprising: one or more memories storing instructions; and one or more processors that execute the instructions being configured to: in response to an operation button being operated, notify a connected information processing apparatus of an operation event; in response to a calibration request from the information processing apparatus in response to the notification of the operation event, execute calibration of the colorimeter; and control so as to notify the information processing apparatus of a result of executing calibration.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Further, in the accompanying drawings, identical or similar components are denoted by identical reference signs, and redundant description will be omitted

First Embodiment

In a first embodiment, a host computer (information processing apparatus) loads control software (a colorimetric application program) that controls colorimeters before determining a colorimeter to be used. A description will be given using an example in which, in response to a request from a colorimeter, the colorimetric application program confirms a colorimeter to be used and causes a transition to a standby state (e.g., a calibration standby) for preparation for starting use. The described components including the following embodiments are merely illustrative and are not intended to limit the scope of the present invention thereto.

Figure 1A:
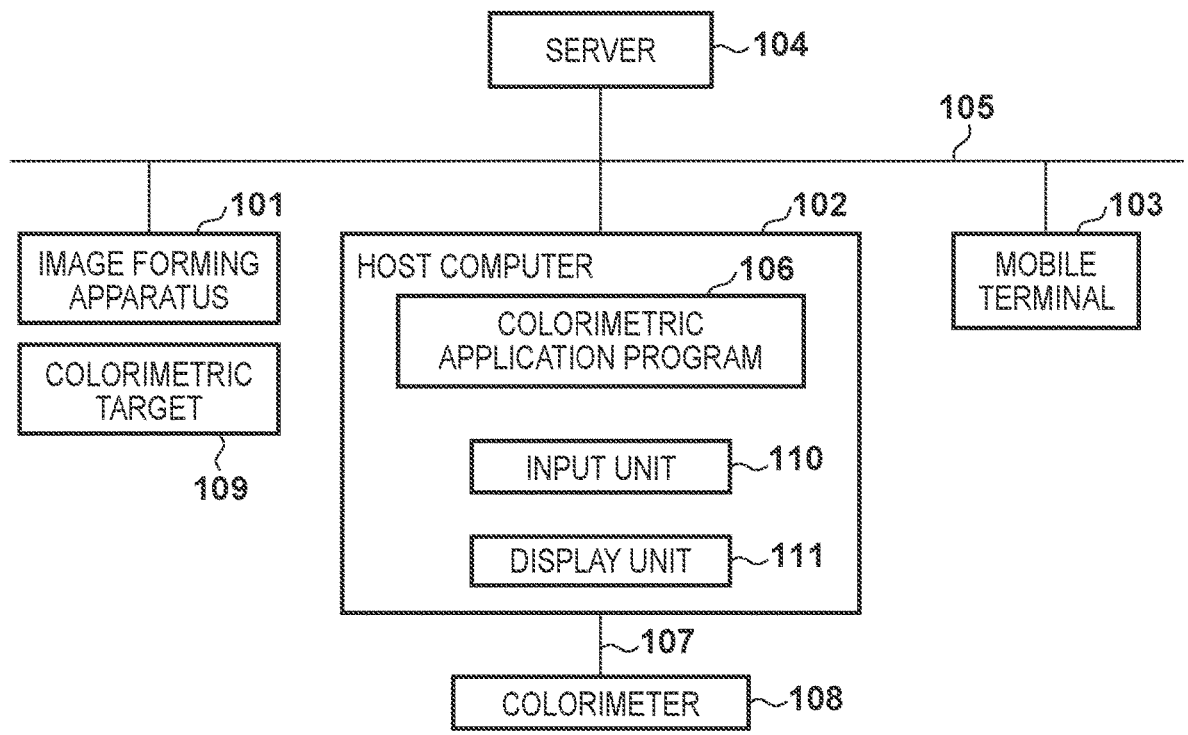
FIG. 1A is a diagram for describing a configuration of a system including a host computer that executes a colorimetric application program according to a first embodiment of the present invention.

FIG. 1A is a diagram for describing a configuration of a colorimetric system including a host computer 102 that executes a colorimetric application program 106 according to a first embodiment of the present invention.

An image forming apparatus 101 generates a colorimetric target 109 by printing image data (forming an image) received from the host computer 102, a mobile terminal 103, a server 104, or the like via a network 105, or held internally.

The colorimetric application program 106 is installed on the host computer 102 and runs on the host computer 102. The colorimetric application program 106 displays an application operation screen on a display unit 111 of the host computer 102 and is operated using an input unit 110, such as a pointing device, a keyboard, and a touch panel. Further, the colorimetric application program 106 performs colorimetry on the patches of the colorimetric target 109 printed by the image forming apparatus 101 using a colorimeter 108 connected to the host computer 102 via a USB 107. In the following description, the colorimetric application program 106 is configured to operate on the host computer 102; however, the present invention is not limited to such a configuration, and the colorimetric application program 106 may operate on any of the image forming apparatus 101, the mobile terminal 103, and the server 104, or a configuration may be taken such that the image forming apparatus 101, the mobile terminal 103, and the server 104 perform a distributed processing in cooperation with each other. Although the colorimeter 108 is configured to be connected to the host computer 102 via the USB 107, it may be configured to be connected to the host computer 102 via the network 105.

Figure 1B:
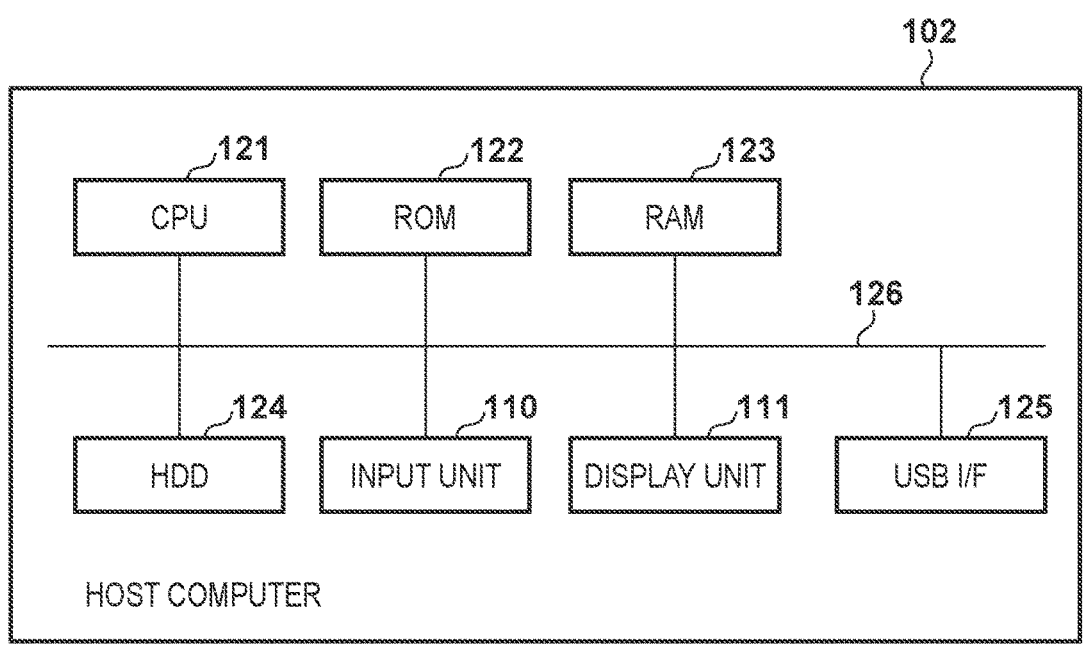
FIG. 1B is a block diagram for describing a schematic hardware configuration of the host computer.

FIG. 1B is a block diagram for describing a schematic hardware configuration of the host computer 102 according to the first embodiment.

A CPU 121 controls each unit connected to a system bus 126 by executing a program deployed from an HDD 124 or a ROM 122 to a RAM 123 and controls all of the processes for the host computer 102. The ROM 122 stores a boot program, various data, and the like. The RAM 123 provides a work area for temporarily storing various programs, data, and the like for when the CPU 121 executes processes and for storing various data and the like used in the processes by the CPU 121. The HDD 124 stores the aforementioned colorimetric application program 106, a colorimeter control program (control software) to be described later, and the like. The input unit 110 and the display unit 111 are the same as in FIG. 1A. A USB interface (I/F) 125 is connected to, for example, a colorimeter according to an embodiment via the USB 107.

Next, a functional configuration of the colorimetric application program 106 to be executed by the host computer 102 will be described.

Figure 2:
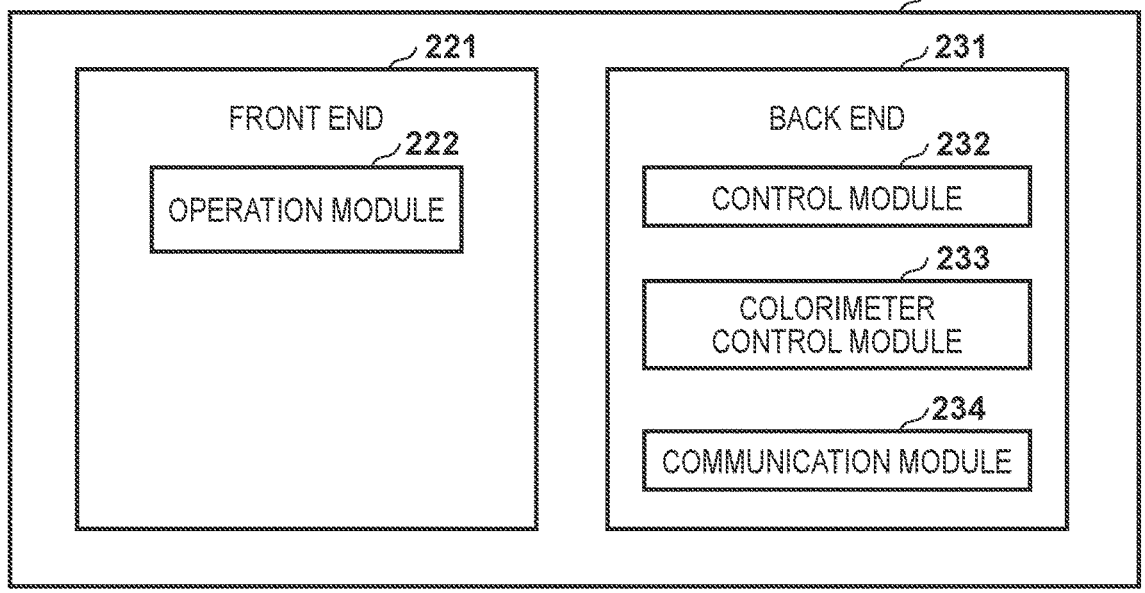
FIG. 2 is a block diagram for describing a functional configuration of the colorimetric application program according to the first embodiment.

FIG. 2 is a block diagram for describing a functional configuration of the colorimetric application program 106 according to the first embodiment.

The colorimetric application program 106 includes a front end 221 and a back end 231. The front end 221 includes, for example, an operation module 222 including a function of a user operation portion to be displayed on the display unit 111. The back end 231 includes a control module 232, which includes functions other than user operation and collectively controls the entire colorimetric application program 106; a colorimeter control module 233 that controls the colorimeter 108; a communication module 234 that communicates with the colorimeter 108, and the like.

The operation module 222 displays an operation screen of the colorimetric application program, such as the one illustrated in FIG. 5, which will be described later, to be displayed on the display unit 111. The operation module 222 updates screen information in response to a notification of a press of a button on an application operation screen by the input unit 110 or a notification of selection from a list of colorimeters (for example, reference numeral 503 in FIG. 5) to be described later. Further, the operation module 222 notifies the colorimeter control module 233 of an event by the input unit 110. The operation module 222 also has a function of updating screen information in response to a notification from the colorimeter control module 233.

The control module 232 collectively controls the entire colorimetric application program 106 by controlling the operation module 222, the colorimeter control module 233, and the communication module 234. The colorimeter control module 233 controls the colorimeter 108 to be connected via the communication module 234 in response to an event notification from the operation module 222. The colorimeter control module 233 receives an event notification from the colorimeter 108 via the communication module 234 and notifies the operation module 222 of the occurrence of an event. Further, the colorimeter control module 233 makes a new control request to the colorimeter 108.

Details on control according to operation event notifications and exchange of the operation event notifications, which are features of the present embodiment, between the front end 221, the back end 231, and the colorimeter 108 will be described later with reference to the sequence diagram of FIG. 4.

Figure 5:
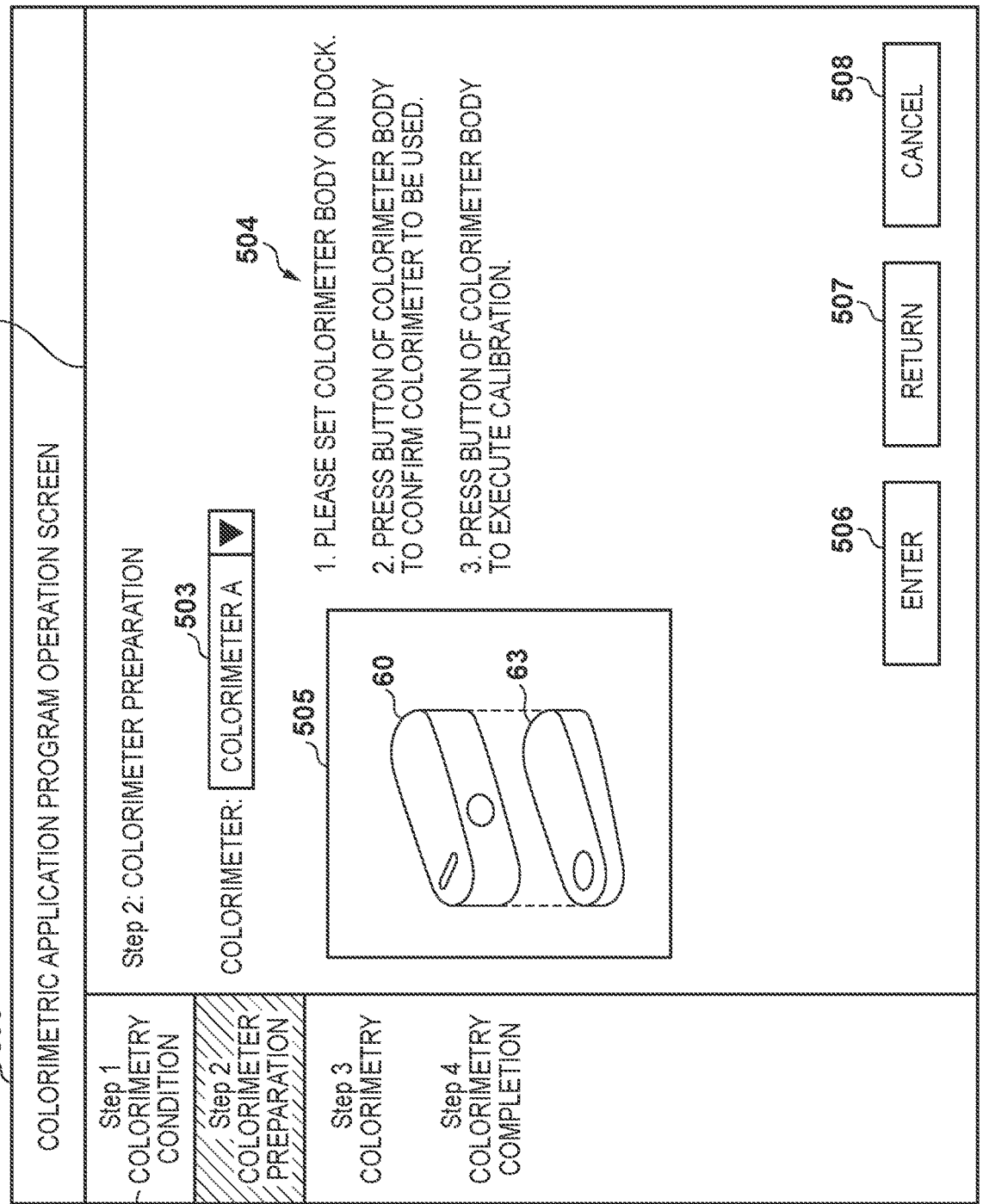
FIG. 5 is a diagram illustrating an example of an operation screen to be displayed on a display unit by the colorimetric application program according to the first embodiment.

FIG. 5 is a diagram illustrating an example of an operation screen to be displayed on the display unit 111 by the colorimetric application program 106 according to the first embodiment.

An operation screen 500 has an area 501 for displaying work process steps necessary for colorimetric work and a work process step content area 502 for indicating the current work process step.

First, an outline of each work process step displayed in the area 501 for displaying work process steps will be described. Only a colorimeter preparation step (Step 2), which is related to a feature of the present embodiment, will be described in detail with reference to FIG. 5.

In a colorimetric condition step (Step 1), chart information, which is a colorimetric target, is registered and selected in response to a notification from the operation module 222. In addition, a method of color comparison against an expectation value, which is used to verify whether a color is equivalent to an expectation value, and information, such as a permissible value for determining whether a comparison result is permissible, are registered and selected in response to a notification from the operation module 222.

In the colorimeter preparation step (Step 2), a connection request is made from the colorimetric application program 106 to a colorimeter. Further, selection and confirmation of a colorimeter to be used, execution of calibration of the colorimeter, and the like are performed in response to an event notification from the operation module 222 or the colorimeter. By this, portions related to the colorimeter are prepared. In FIG. 5, emphasis display indicating that the current step is the colorimeter preparation step (Step 2) is performed.

In a colorimetry step (Step 3), a colorimetric target is measured in response to a colorimetry execution request from the colorimeter that has been confirmed to be used in the colorimeter preparation step (Step 2). At this time, in the work process step content area 502, a layout of a chart that is the colorimetric target is displayed and information of a target patch to be measured next and patches for which colorimetry has been or has not been completed is appropriately updated in accordance with colorimetric work for the patches.

In a colorimetric completion step (Step 4), for example, comments for colorimetric work are inputted and the result of colorimetry is stored in response to a notification from the operation module 222.

Next, the contents of the work process step content area 502 will be described. In FIG. 5, the contents of the colorimeter preparation step (Step 2) related to a feature of an embodiment is displayed.

A colorimeter list 503 displays a list of colorimeters that can be used by the colorimetric application program 106. Among the colorimeters that the colorimetric application program 106 supports control over, colorimeters recognized to be currently connected are displayed in the colorimeter list 503. When a plurality of colorimeters are recognized, a target colorimeter can be changed by the input unit 110 including a pointing device and the like. A configuration may be taken so as to display this list including colorimeters for which connection therewith is currently not recognized. FIG. 5 illustrates a state in which the colorimetric application program 106 has recognized connection with a "colorimeter A" and is displaying the "colorimeter A" in the colorimeter list 503.

A text display area 504 relating to colorimeter preparation work and an image display area 505 display colorimeter preparation work information relating to the colorimeter currently selected in the colorimeter list 503. If there is no colorimeter recognized to be currently connected and in a useable state, the text display area 504 displays a colorimeter connection request and information on connection work. In the present embodiment, a colorimeter is confirmed by a first press of a button of a colorimeter body, and calibration is executed by a second press; however, the present invention is not limited to this. As illustrated in FIG. 5, if there is an instruction, in a prior procedure, for setting a colorimeter body 60 to a dock 63 to set it to an apparatus state in which calibration can be executed, colorimeter confirmation and calibration may be executed by a single press of the button.

An enter button 506 is a button for confirming, using the input unit 110 which may be a pointing device or the like, the colorimeter selected in the colorimeter list 503 as a colorimeter to be used and causing the colorimeter to transition to a standby state (e.g. a calibration standby state) for usage preparation. When the colorimeter is confirmed, a pop-up notification (not illustrated) is performed and the colorimeter list 503 is grayed out. The first embodiment includes a feature of, by a press of a button (details will be described later) included in a colorimeter that has not been confirmed as a target colorimeter, confirming that colorimeter whose button has been pressed as a target colorimeter and transitioning to a standby state for usage preparation of that colorimeter. It is assumed that the first embodiment includes the feature even when calibration execution is transitioned to after confirmation of a colorimeter whose button has been pressed as a target colorimeter without a standby state for usage preparation therebetween.

A return button 507 is a button for returning the work process step to a previous step, and in the case of FIG. 5, if a colorimeter to be used has not been confirmed, a screen of the colorimetry condition step (Step 1) is returned to. If a colorimeter to be used has been confirmed, the system returns to a phase before confirmation of the colorimeter. A cancel button 508 is a button for cancelling all of the work process steps in the colorimetry.

Figure 6:
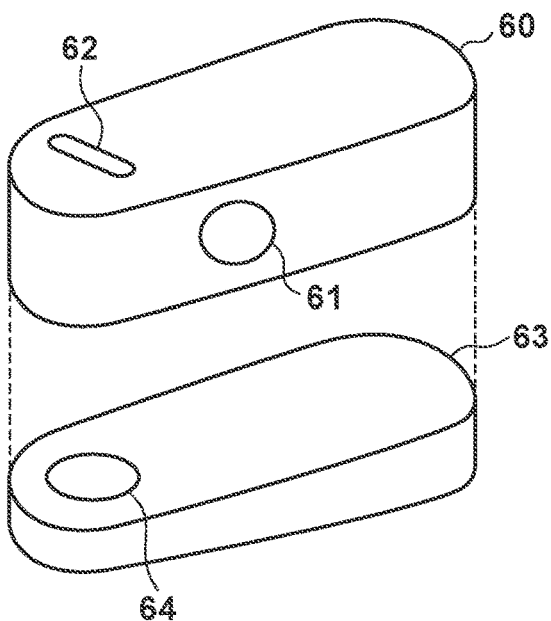
FIG. 6 is a diagram illustrating an example of a handheld colorimeter according to the first embodiment.

FIG. 6 is a diagram illustrating an example of the handheld colorimeter 108 according to the first embodiment.

As described above, the colorimeter 108 includes the colorimeter body 60 and the dock 63 for placing the colorimeter body 60. The colorimeter body 60 is configured by a rounded shape and, on the bottom surface, includes an opening (not illustrated) that is disposed with respect to a colorimetric target. The dock 63 includes a white member 64 at a position at which it can be measured when the colorimeter body 60 is set.

The colorimeter body 60 receives reflected light obtained by irradiating illumination light to a colorimetric target from inside the body and, based on the reflected light, performs colorimetry of the colorimetric target. The colorimeter body 60 includes a calibration function for stabilizing a white colorimetric value by performing colorimetry of the white member 64 while it is placed on the dock 63. A configuration may be taken so as to incorporate the white member 64 in the colorimeter body 60 such that even when the colorimeter body 60 is not placed on the dock 63, the calibration function of the colorimeter body 60 can be executed.

A button 61 is provided on a side surface of the colorimeter body 60; further, a plurality of indicators (output unit) 62 including an LED (light emitting diode) lamp and the like are disposed at a position in an upwards direction of the button 61.

The button 61 controls execution of a calibration function or a colorimetric function using illumination light included in the colorimeter body 60. When the button 61 is pressed, a button press event is notified to the colorimetric application program 106 running on the host computer 102 connected to the colorimeter body 60 via the USB 107. In the first embodiment, this event notification is also used for cases other than the control related to the use of the illumination light included in the colorimeter body 60, and the first embodiment includes a feature of using this event notification for an operation instruction for the colorimetric application program 106 (such as an instruction for confirmation of a colorimeter to be used and an instruction for starting preparation for usage of the colorimeter).

The number of buttons is not limited to one; there may be a plurality of buttons, and for example, buttons to be used may be separated between a button for control related to the use of the illumination light included in the colorimeter body 60 and a button for controlling the colorimetric application program 106.

The indicators 62 display a control status of the colorimeter body 60. An example of lighting control of the indicators 62 is illustrated below; however, the present invention is not limited to this. One of the features of the first embodiment is lighting control of an LED from which it can be seen that, in a state in which the connection between the colorimetric application program 106 and the colorimeter 108 is established, the colorimeter 108 to be used has changed from unconfirmed to confirmed and the colorimeter 108 to be used has transitioned to a standby state for usage preparation. In the first embodiment, a description has been given using an example of display using the indicators 62 as a method of expressing a change in status; however, the present invention is not limited to this. The method may be output by sound, voice, or the like using the colorimetric application program 106, a sound controller (not illustrated) of the colorimeter body 60, or the like.

For example, in the first embodiment, when the connection between the colorimetric application program 106 and the colorimeter 108 is established, the LED is in an off state, indicating that the colorimeter 108 to be used is in a standby state until confirmation is performed in the colorimetric application program 106.

Once the colorimeter 108 to be used is confirmed, the indicators 62 become continuously on, indicating that the colorimeter 108 to be used has been confirmed and the colorimeter 108 is in a standby state (e.g., a calibration execution standby state) for usage preparation. Further, in the execution of calibration or the execution of colorimetric processing of the colorimeter 108, the indicators 62 presents success or failure of the execution result by blinking at short intervals in a color corresponding to the execution result. Then, if the calibration has been successfully executed, the indicators 62 will always blink to indicate that the colorimeter 108 is in a colorimetry standby state.

Next, a configuration of the colorimeter body 60 of the colorimeter 108 will be described.

Figure 3:
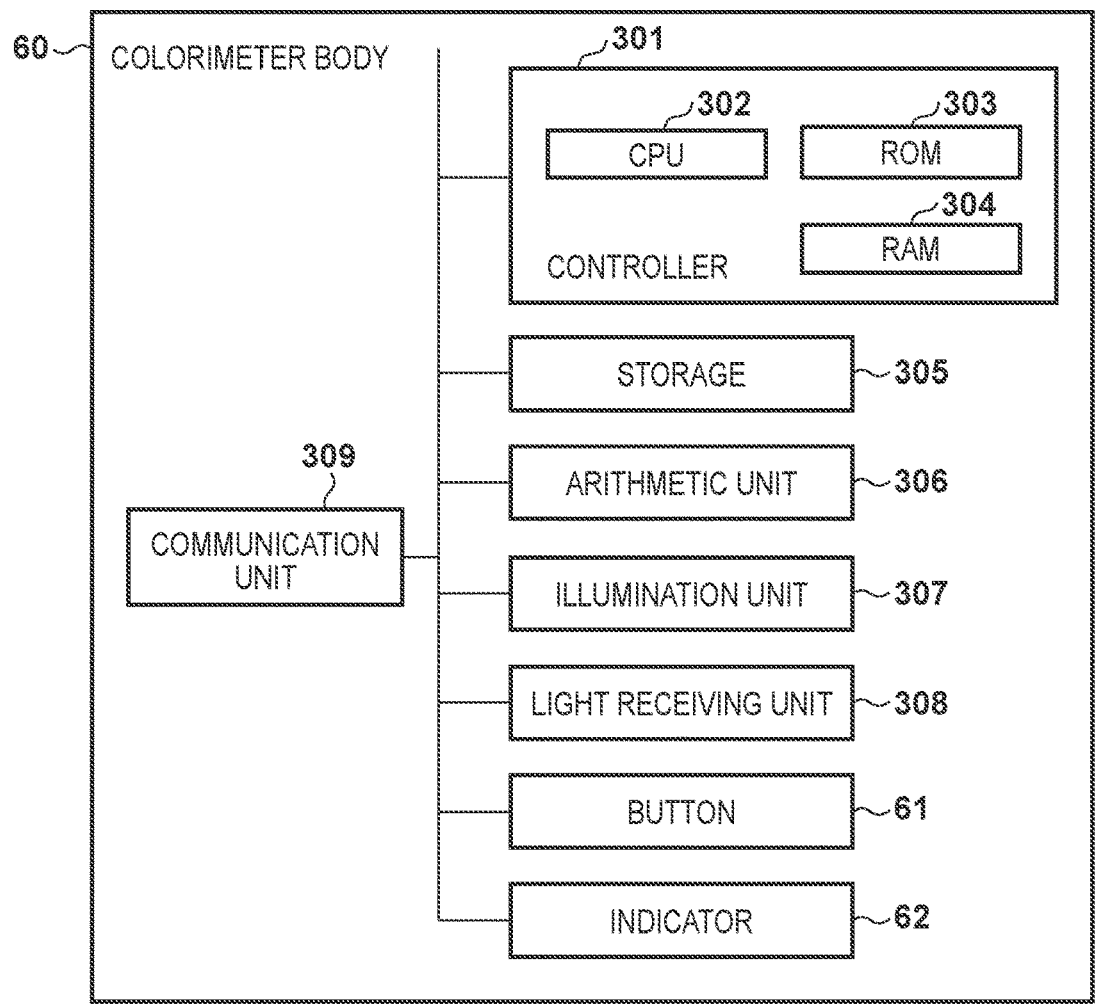
FIG. 3 is a block diagram for describing a hardware configuration of a colorimeter body according to the first embodiment.

FIG. 3 is a block diagram for describing a hardware configuration of the body 60 of the colorimeter 108 according to the first embodiment.

In addition to the button 61 and the indicators 62 described in FIG. 6, the colorimeter body 60 includes, a controller 301, a storage 305, an arithmetic unit 306, an illumination unit 307, a light receiving unit 308, a communication unit 309, and the like. The controller 301 is for collectively controlling the entire colorimeter body 60 and includes a CPU 302, a ROM 303, and a RAM 304. The CPU 302 operates according to operation programs stored in the ROM 303 or the storage 305, thereby realizing the functions of the colorimeter body 60. The RAM 304 provides a work area for when the CPU 302 operates according to the operation programs.

The illumination unit 307 is for applying illumination light onto the colorimetric target 109, and the light receiving unit 308 includes a sensor for receiving reflected light obtained by irradiating the illumination light to the colorimetric target 109. The illumination light may be of only one type or selected from a plurality of types. Based on the reflected light received by the light receiving unit 308, the arithmetic unit 306 performs arithmetic operations for colorimetry by a known method. In the first embodiment, the arithmetic unit 306 is realized as part of the functions of the CPU 302 of the controller 301. In the first embodiment, a result of colorimetry by the arithmetic unit 306 is transmitted to the colorimetric application program 106 running on the host computer 102 connected over USB via the communication unit 309. A configuration may be taken so as to transmit the data received by the light receiving unit 308, rather than the result of colorimetry by the arithmetic unit 306, to the colorimetric application program 106 and perform the arithmetic operations for colorimetry on the colorimetric application program 106 side. The storage 305 includes a non-volatile memory, such as a flash memory, NAND memory, or EEROM, and may be included in the controller 301. The storage 305 stores, for example, results of arithmetic operation by the arithmetic unit 306. The communication unit 309 is a communication interface that is connected to the colorimetric application program 106 running on the host computer 102 via the USB 107 and transmits and receives data. The connection with the host computer 102 is not limited to USB and may be performed by a wired or wireless network.

Figure 9:
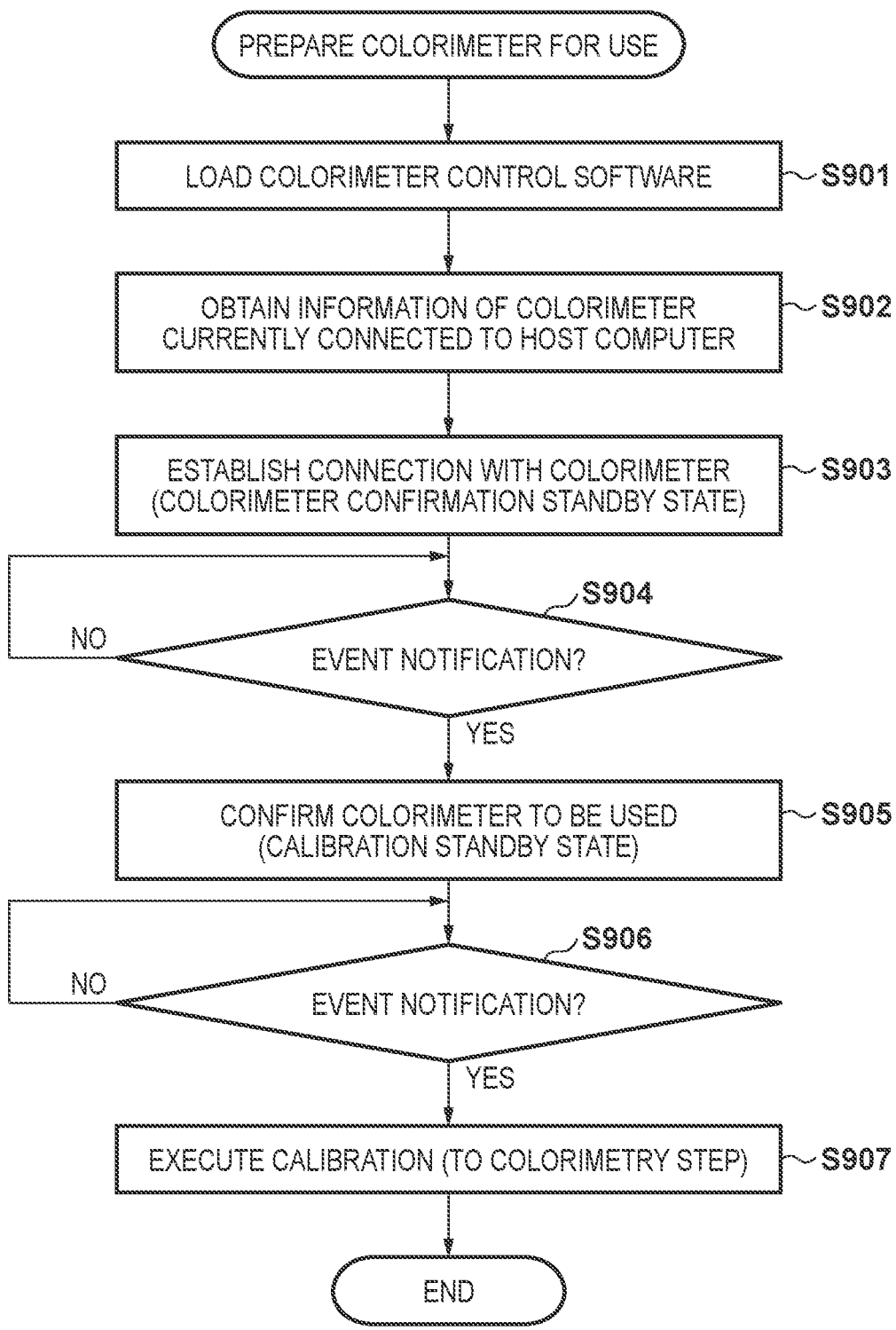
FIG. 9 is a flowchart for explaining a rough process of the colorimeter preparation step implemented by execution of the colorimetric application program by the host computer according to the first embodiment.

FIG. 9 is a flowchart for explaining general processing for a colorimeter preparation step implemented by execution of the colorimetric application program 106 by the host computer 102 according to the first embodiment. The process described in this flowchart is achieved by the CPU 121 of the host computer 102 executing the colorimetric application program 106.

First, in step S901, the CPU 121 enters a colorimeter usage preparation step in which it loads colorimeter control software and installs the control software on the HDD 124. Here, in the first embodiment, the CPU 121 loads the control software of the colorimeter 108 of all the models supported by the colorimetric application program 106. The CPU 121 may determine a connected colorimeter by using the functions provided by the OS running on the host computer 102 prior to loading the control software. In that case, a configuration may be taken so as to obtain the name and the device ID of a device connected to the host computer 102, determine whether that connected device is the colorimeter 108 supported by the colorimetric application program 106, and limit the control software to be loaded. By thus suppressing the loading of unnecessary control software, it is possible to suppress the utilization rate of memory resources, such as the HDD 124 and the RAM 123 of the host computer 102, by the colorimetric application program 106.

Next, the processing proceeds to step S902, and the CPU 121 obtains information of the colorimeter 108 connected to the host computer 102 via the USB 107 using the functions of the loaded control software. Next the processing proceeds to step S903, and the CPU 121 establishes connection with the colorimeter 108. At this time, when the connection with the colorimeter 108 is established, the CPU 121 causes the colorimeter 108 to be used to transition to a confirmation standby state. Meanwhile, when the connection with the colorimeter cannot be established, the CPU 121 notifies an error and repeats the processing from step S902 after the error is resolved.

Next, the processing proceeds to step S904, and the CPU 121 waits for the input unit 110 to notify an event or the colorimeter 108 to notify an event that the button 61 has been pressed and, when the event is notified, the processing proceeds to step S905 and the CPU 121 determines the colorimeter 108 to be used. Then, the processing transitions to a calibration standby state. Then, the processing proceeds to step S906, and the CPU 121 waits for the input unit 110 to notify an event or the colorimeter 108 to notify an event that the button 61 has been pressed and, when the event is notified, the processing proceeds to step S907 and the CPU 121 executes calibration. Then, if the calibration is successfully executed, the CPU 121 transitions to the colorimetry step. Meanwhile, if the calibration is not successfully executed, the CPU 121 repeats the processing of step S907.

The calibration standby state of step S905 is not essential if the colorimeter 108 contains a white member and calibration can be performed in the colorimeter body 60. In addition, also when there has been an instruction for setting the colorimeter body 60 to the dock 63 in a prior procedure for the colorimeter to be in a state capable of performing calibration as described above in FIG. 5, the calibration standby state of step S905 is not essential. After confirming the colorimeter 108 to be used in step S905, the CPU 121 may skip the calibration standby state and execute the calibration of step S907 based on information, such as the type and capability of the colorimeter 108. Similarly, for example, a configuration may be taken so as to, if there is no additional work for the colorimetric between the work for confirming the colorimetric to be used and the work for performing calibration in the text display area 504 of the colorimetric application program 106 of FIG. 5, skip the calibration standby state and execute the calibration of step S907. In these cases, a configuration is taken so as to confirm the colorimeter 108 to be used and execute calibration with a single notification from the input unit 110 or the colorimeter 108 in step S904.

This concludes the flow for explaining general processing of the colorimeter preparation step by the host computer 102 executing the colorimetric application program 106 and the colorimeter 108. A feature of the first embodiment includes loading the colorimeter control software before a step of "confirming a colorimeter to be used" and implementing the step of "confirming a colorimeter to be used" by a notification from the colorimeter 108 and the invention is not limited to the processing flow of FIG. 9.

Next, details of processing for the colorimetric application program 106 and the colorimeter 108 during non-exceptional standard operation, will be described.

Figure 4:
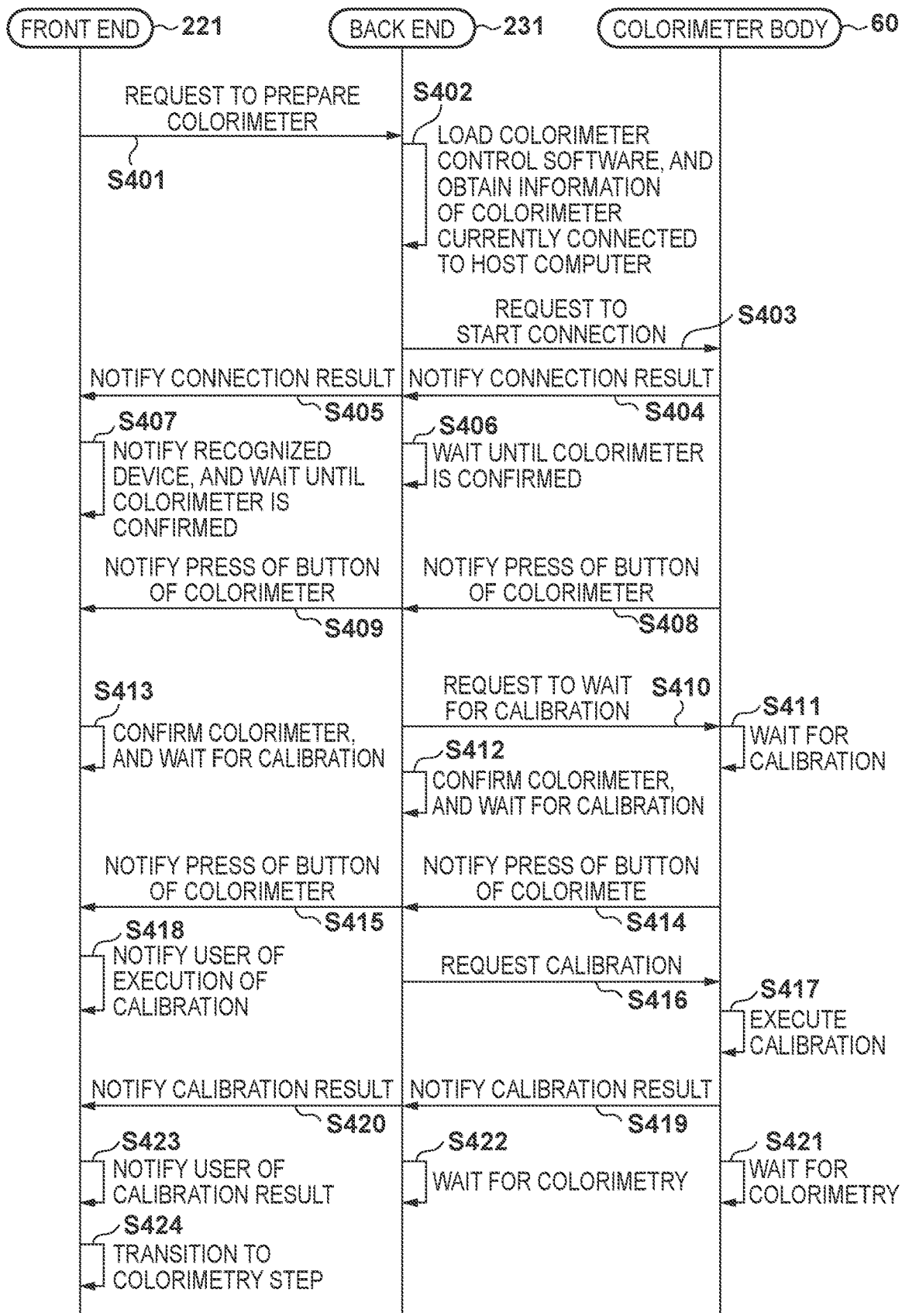
FIG. 4 is a sequence diagram for explaining a process of a colorimeter preparation step by the colorimetric application program and the colorimeter body according to the first embodiment.

FIG. 4 is a sequence diagram for explaining processing for the colorimeter preparation step by the colorimetric application program 106 and the colorimeter body 60 according to the first embodiment. Here, an example in which, upon receiving a notification of a press of the button 61 from the colorimeter body 60 that has not been confirmed as a colorimeter to be used, the colorimeter body 60 is confirmed as a colorimeter to be used and is transitioned to a standby state for usage preparation is given. The processing for the front end 221 and the back end 231 of the colorimetric application program 106 illustrated in FIG. 4 is realized by being executed using the CPU 121, the ROM 122, the RAM 123, and the like of the host computer 102. Further, the processing for the colorimeter body 60 is realized by being executed by the controller 301 of the colorimeter body 60.

In step S401, the front end 221, which has transitioned to the colorimeter preparation step, makes a colorimeter preparation request to the back end 231. By this, in step S402, the back end 231 loads control software for controlling the colorimeter 108. Then, the back end 231 obtains information of a colorimeter connected to the host computer 102 via the USB 107 using the functions of the loaded control software.

Next, in step S403, the back end 231 requests the colorimeter body 60 for which connection with the host computer 102 has been confirmed to start connection with the colorimetric application program 106. Then, in step S404, the colorimeter body 60 notifies the back end 231 of the connection result for the request for starting connection with the colorimetric application program 106. Thus, in step S405, the back end 231 receives the connection result notification from the colorimeter body 60 and notifies the front end 221 of the connection result.

In step S406, when the notification of the connection result from the colorimeter body 60 is OK and the connection is established, the back end 231 transitions to a standby state until a colorimeter to be used is confirmed. At this time, in step S407, when the connection result notification from the back end 231 is OK and the connection with the colorimeter 108 is established, the front end 221 notifies the user of the colorimeter 108 that has established connection as a colorimeter recognized by the colorimetric application program 106. Then, the front end 221 transitions to a standby state until the colorimeter is confirmed.

Next, in step S408, in response to the user pressing the button 61 of the colorimeter body 60, the colorimeter body 60 notifies the back end 231 that the button 61 of the colorimeter has been pressed. By this, in step S409, upon receiving the notification that the button 61 has been pressed from the colorimeter body 60 while waiting for confirmation of the colorimeter, the back end 231 also notifies the front end 221 that the button 61 of the colorimeter has been pressed. A configuration may be taken so as to, rather than notifying the front end 221 that the button 61 of the colorimeter has been pressed, notify the front end 221 to confirm the colorimeter body 60 whose button 61 has been pressed as the colorimeter to be used.

Next, in step S410, upon receiving the notification that the button 61 has been pressed, the back end 231 confirms the colorimeter on which the button 61 has been pressed as the colorimeter to be used and requests that confirmed colorimeter body 60 to standby for calibration. By this, in step S411, the colorimeter body 60 transitions control to a calibration standby state. Further, in step S412, upon receiving the notification of a press of the button 61 from the colorimeter body 60, the back end 231 confirms the colorimeter to be used and transitions to a calibration standby state. In step S413, upon receiving the notification of a press of the button 61 of the colorimeter from the back end 231, the front end 221 confirms the colorimeter body 60 whose button has been pressed as the colorimeter to be used. Then, by a pop-up notification (not illustrated) and graying out of the colorimeter list 503, the front end 221 notifies the user that the colorimeter to be used has been confirmed and transitions to a calibration standby state.

Next, in step S414, when a press of the button 61 of the colorimeter body 60 by the user in the calibration standby state is received, the colorimeter body 60 notifies the back end 231 that the button 61 of the colorimeter has been pressed. Next, in step S415, upon receiving the notification that the button 61 has been pressed from the colorimeter body 60 in the colorimeter calibration standby state, the back end 231 also notifies the front end 221 that the button 61 of the colorimeter has been pressed. A configuration may be taken so as to, rather than notifying the front end 221 that the button of the colorimeter has been pressed, notify the front end 221 to execute the calibration of the colorimeter.

Next, in step S416, in response to the reception of the notification that the button 61 has been pressed from the colorimeter body 60 in the colorimeter calibration standby state, the back end 231 requests the colorimeter body 60 to execute calibration. By this, in step S417, in response to that calibration request, the colorimeter body 60 executes calibration. At this time, in step S418, upon receiving the notification that the button 61 of the colorimeter 60 has been pressed from the back end 231 in the colorimeter calibration standby state, the front end 221 notifies the user that calibration is being executed, for example, by a pop-up notification or an execution-in-progress animation (not illustrated).

Next, in step S419, the colorimeter body 60 notifies the back end 231 of the result of execution of calibration. By this, in step S420, upon receiving the notification of the calibration execution result from the colorimeter body 60, the back end 231 notifies the front end 221 of the calibration execution result. Then, in step S421, if the calibration execution result is successful, the colorimeter body 60 transitions to a standby state until the colorimetry is actually performed. Similarly, in step S422, if the calibration execution result from the colorimeter body 60 is successful, the back end 231 transitions to a standby state until the colorimetry is actually performed. Further, in step S423, the front end 221 notifies the user of the calibration execution result from the back end 231 by a pop-up notification (not illustrated) or the like. Then, in step S424, if the calibration execution result from the back end 231 is successful, the front end 221 transitions from the colorimeter preparation step to the colorimetry step of actually performing colorimetry.

This concludes the description for processing for the colorimeter preparation step by the colorimetric application program 106 and the colorimeter body 60 according to the first embodiment. In the first embodiment, the colorimetric application program 106 loads the colorimeter control software before determining the colorimeter to be used for colorimetry. The first embodiment includes a feature of, in response to a press of an operation button from a connected colorimeter before a colorimeter to be used is confirmed, confirming that colorimeter as the colorimeter to be used and causing the colorimeter to transition to a standby state for usage preparation. However, the present invention is not limited to the processing illustrated in the sequence of FIG. 4; it is assumed that a configuration need only accord with the spirit of the present embodiment without departing from the scope of the present invention. For example, it is assumed that a configuration accords with the spirit of the present embodiment even when calibration execution is transitioned to after confirmation of a colorimeter whose button has been pressed as a target colorimeter without a standby state for usage preparation therebetween.

As described above, according to the first embodiment, the colorimetric application program 106 loads the colorimeter control software before determining the colorimeter to be used for colorimetry. Then, in response to a press of a button (first operation) on a connected colorimeter before confirmation of a target colorimeter, the colorimetric application program 106 confirms the colorimeter as the target colorimeter. Then, the colorimetric application program 106 causes that colorimeter to transition to a standby state for usage preparation (e.g., a calibration standby state). Then, when an operation button of the colorimeter is operated next, the colorimetric application program 106 requests that colorimeter to execute calibration. Alternatively, in response to a press of a button of a connected colorimeter before confirmation of a target colorimeter, the colorimetric application program 106 confirms the colorimeter as the target colorimeter. Then, the colorimetric application program 106 requests the colorimeter to execute calibration.

This makes it possible, in operation of a colorimetric application program, for a user to operate (perform confirmation of a colorimeter, transition to a standby state for usage preparation, or confirmation of a colorimeter followed by a calibration execution request) a colorimetric application program using a button of a colorimeter from a stage before confirmation of a colorimeter to be used.

In colorimetric work, it is common for the colorimeter body 60 to repeatedly perform colorimetry by being moved over a sheet, such as a color chart that is a colorimetric target. It is also common for the colorimeter body 60 to be operated in a limited workspace in a printing factory. It is possible to reduce the amount of operation and the number of operations of a pointing device on a colorimetric application program in colorimetric work in such an environment. This makes it possible to reduce the number of switches between the pointing device and the colorimeter body 60 and prevent the operation of the pointing device from interfering with the operational traffic line of the colorimeter body 60, thereby enabling reduction of the burden on an operator.

Second Embodiment

The colorimeter 108 used in the present embodiment may be of a handheld type of colorimetry as illustrated in FIG. 6 or of an automatic colorimetry type in which a colorimetric target is automatically pulled inside for colorimetry. It is also possible to change a colorimetry condition by attaching an optional attachment to the colorimeter. Therefore, it is also conceivable that a plurality of colorimeters are connected to the host computer 102 and the colorimetric application program 106 operates by using one from a plurality of colorimeters depending on the use case.

Figure 10:
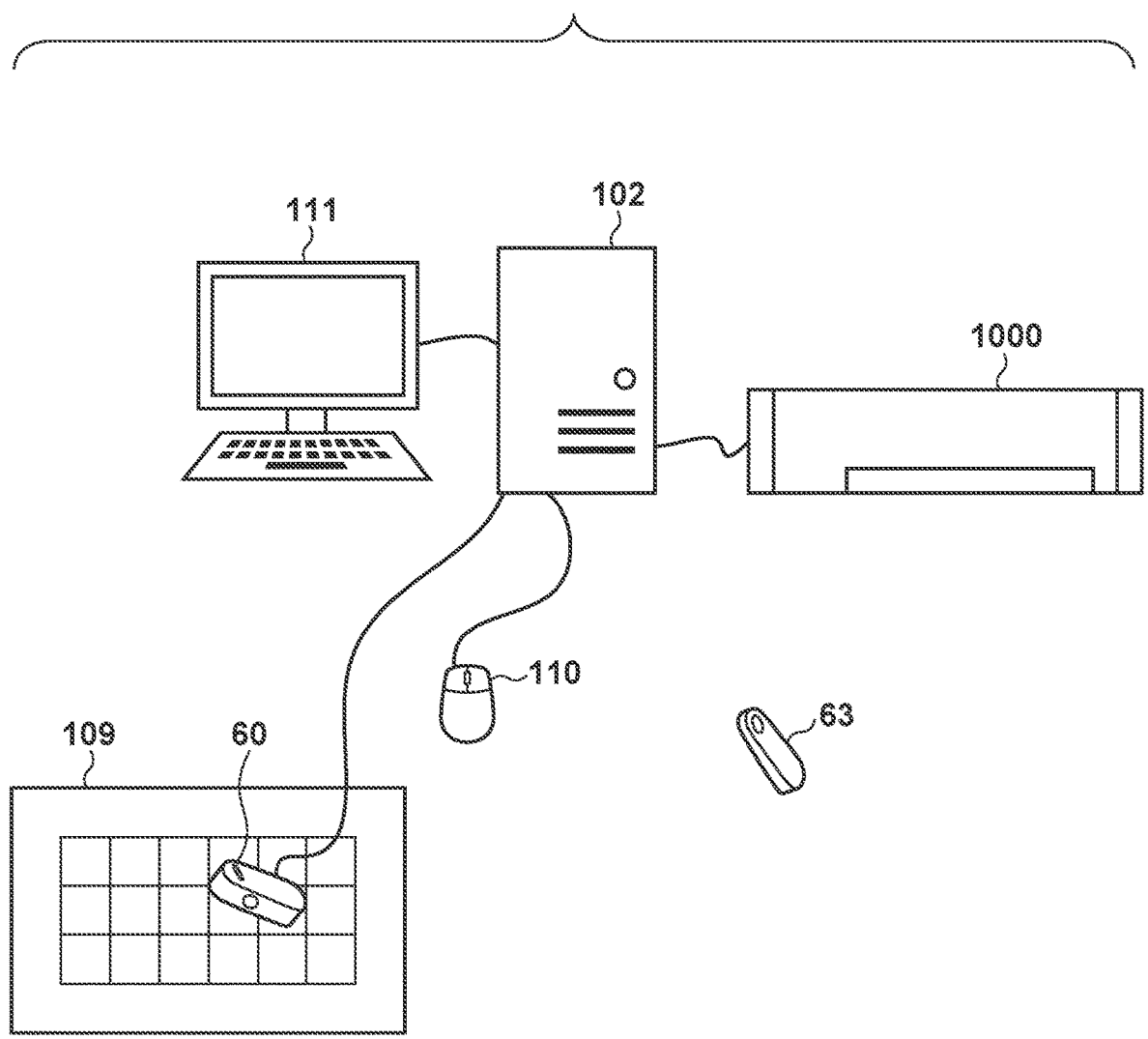
FIG. 10 is a diagram for describing an example of a colorimetric system including colorimeters and the host computer according to the second embodiment.

FIG. 10 is a diagram illustrating an example of a colorimetric system including a colorimeter and the host computer 102 according to the second embodiment.

In FIG. 10, the host computer 102 and two colorimeters are connected. One of them is the colorimeter 108 (the body 60 and the dock 63) of the handheld type of colorimetry described in the first embodiment, and the other is a colorimetric apparatus 1000 of an automatic colorimetry type. In FIG. 10, the configurations that are the same as in the aforementioned first embodiment are assigned the same reference numerals, and the description thereof will be omitted.

Therefore, in the second embodiment, a description will be given using an example in which, in a state in which the colorimetric application program 106 recognizes connection with a plurality of colorimeters, control for selecting or confirming a colorimeter to be used in accordance with a request from a colorimeter. The basic configuration and flow of processing for the second embodiment are substantially the same as those of the aforementioned first embodiment; assume that only the differences will be described below.

First, in step S402 of FIG. 4 described in the first embodiment, when connection between the host computer 102 and a plurality of colorimeters is confirmed, a connection start request to a colorimeter and a connection result notification of the colorimeter of steps S403 to S405 are performed with the respective colorimeters. By this, a plurality of colorimeters are displayed in the colorimeter list 503 of FIG. 5 and become selectable. In the second embodiment, the colorimeter 108 according to the first embodiment and the colorimetric apparatus 1000 are selectable, and it is assumed that the colorimeter 108 is currently in a selected state.

Next, processing for a notification of a press of a button of a colorimeter in a colorimeter confirmation standby state considering a case where a plurality of colorimeters are connected to the colorimetric application program 106, which is a feature of the second embodiment, will be described with reference to FIG. 7.

Figure 7:
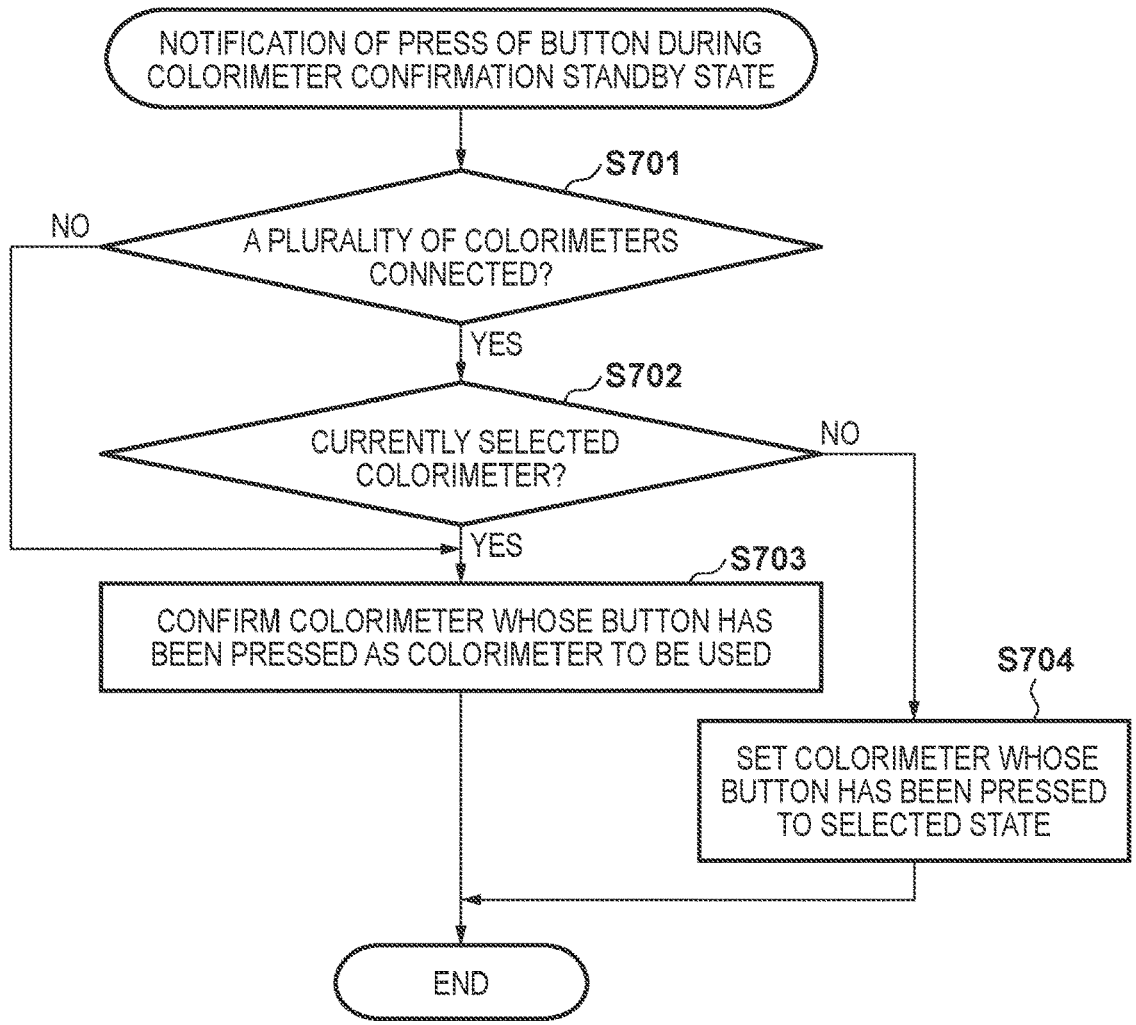
FIG. 7 is a flowchart for explaining a process of selection or confirmation of a colorimeter implemented by execution of the colorimetric application program by the host computer according to a second embodiment.

FIG. 7 is a flowchart for explaining processing for selecting or confirming a colorimeter implemented by execution of the colorimetric application program 106 by the host computer 102 according to the second embodiment. The process described in this flowchart is achieved by the CPU 121 of the host computer 102 executing the colorimetric application program 106.

This processing is started upon receiving a notification that the button 61 has been pressed from a connected colorimeter. First, in step S701, the CPU 121 determines whether the host computer 102 and a plurality of colorimeters have started connection. If connection has been started with more than one colorimeter, the processing proceeds to step S702, and if there is only one colorimeter that has started connecting, the processing proceeds to step S703. In step S702, the CPU 121 determines whether a notification of a press of the button 61 is from the colorimeter 108 currently selected in the colorimeter list 503. If the notification is from the currently selected colorimeter 108, the processing proceeds to step S703, and if the notification is from the colorimetric apparatus 1000 that is not currently selected, the processing proceeds to step S704. In step S703, the CPU 121 determines the colorimeter 108 whose button has been pressed as the target colorimeter to be used and terminates this processing. This is the same operation as in the sequence diagram of FIG. 4 described in the aforementioned first embodiment.

Meanwhile, in step S704, the CPU 121 changes the colorimeter that is selected in the colorimeter list 503 to the colorimetric apparatus 1000 whose button has been pressed. Then, information of the text display area 504 relating to colorimeter preparation work and the image display area 505 are also updated to those for the colorimetric apparatus 1000.

Figure 8:
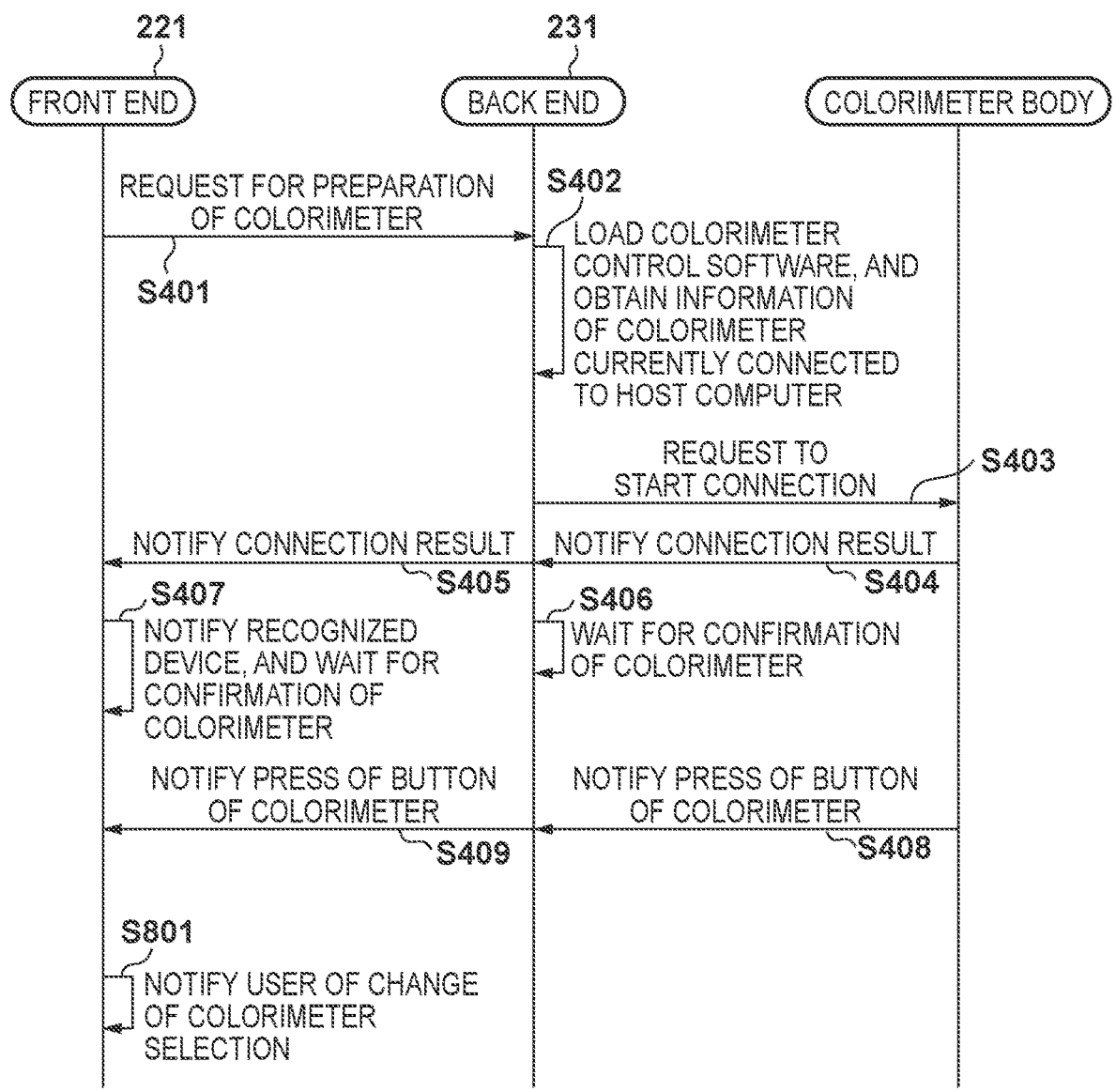
FIG. 8 is a sequence diagram for explaining a process of step S704 according to the second embodiment.

FIG. 8 is a sequence diagram for explaining processing of step S704 according to the second embodiment. In FIG. 8, processing that is the same as in the aforementioned FIG. 4 are assigned the same reference numeral, and the description thereof will be omitted.

In step S408 of FIG. 8, when a notification that a button has been pressed in a colorimeter is received, the back end 231 notifies the front end 221 of that. In step S801, if the colorimeter whose button has been pressed is not the currently selected colorimeter, the front end 221 selects the colorimetric apparatus 1000 whose button has been pressed in place of the currently selected colorimeter and notifies the user of that.

In step S704 of FIG. 7, the currently selected colorimeter is simply changed, and the front end 221 and the back end 231 maintain a standby state until the colorimeter is confirmed. That is, they are in a state of waiting for a notification of a press of a button from the colorimeter again and, next time there is a notification that a button has been pressed from a colorimeter, executes the flowchart of FIG. 7 again.

In step S704 of the second embodiment, the colorimeter that is selected is changed; however, by an option setting (not illustrated), the colorimeter that is selected may be changed to the colorimetric apparatus 1000 and, at the same time, the colorimetric apparatus 1000 may be decided as the colorimeter to be used.

As described above, according to the second embodiment, it is possible to, in a state in which the colorimetric application program 106 recognizes connection with a plurality of colorimeters, select or confirm a colorimeter to be used in accordance with a request from a colorimeter. This makes it possible to, even when a plurality of colorimeters are connected, select or confirm a colorimeter without operating an input unit, such as a pointing device, connected to a host computer, thereby enabling reduction of burden on a colorimetry worker.

Third Embodiment

Next, a third embodiment of the present invention will be described.

The colorimeter body 60 receives reflected light obtained by applying illumination light to a colorimetric target from inside the body and, based on that reflected light, performs colorimetry of the colorimetric target.

The colorimeter body 60 has a scan measurement mode in which patches of one row are measured by being slid over a plurality of patches arranged in one row of the colorimetric target 109 during a period from pressing of the button 61 by the user until the pressing is released. At this time, since part of the light is transmitted through the colorimetric target 109, the colorimeter body 60 also receives light including a reflected light component from a backing material of the colorimetric target 109, such as a desk.

Figure 11:
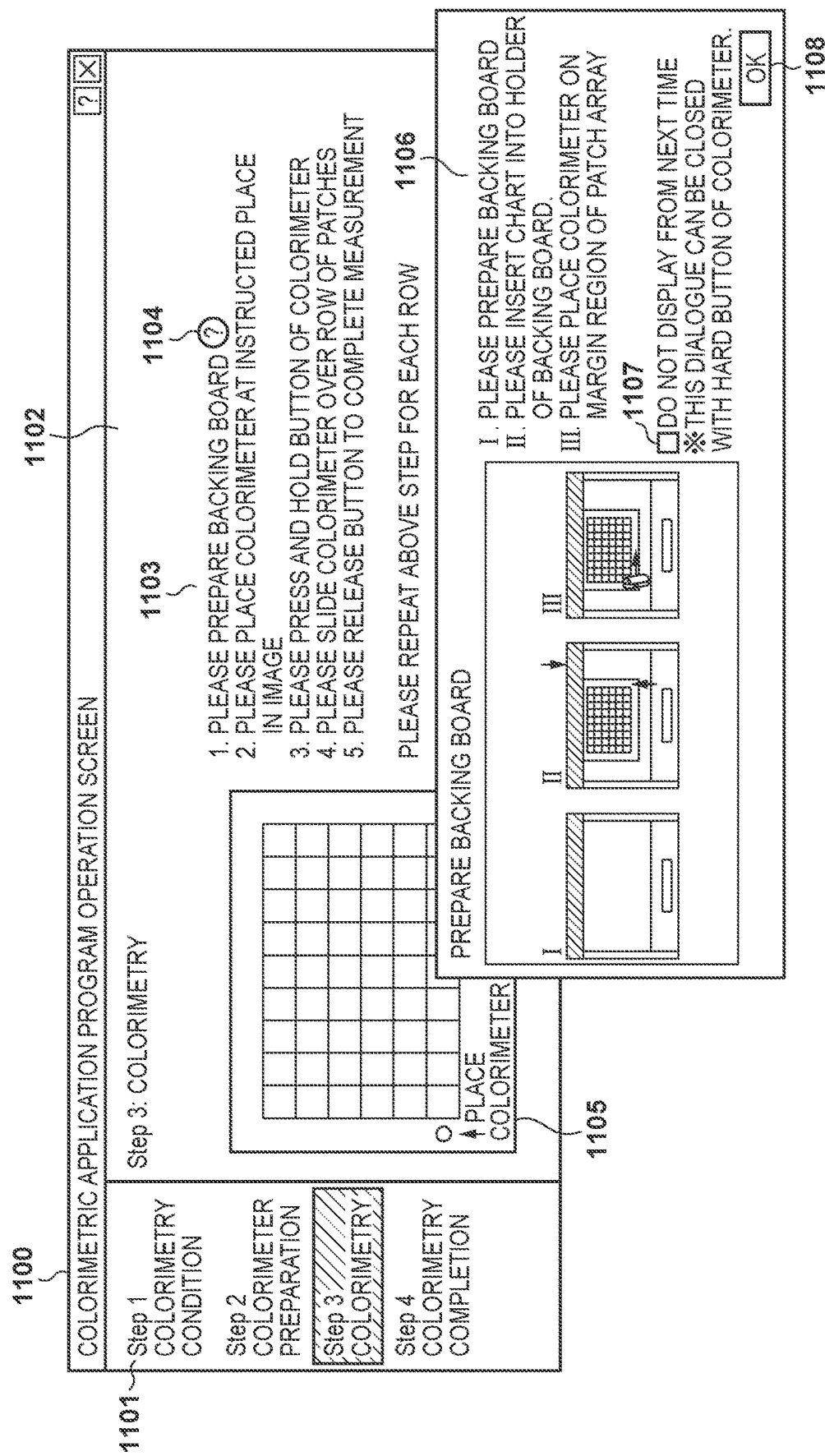
FIG. 11 is a diagram illustrating an example of an operation screen displayed on a display unit of the host computer by the colorimetric application program according to a third embodiment.

Therefore, in order to reduce an effect on a colorimetric value due to such a difference in the use environment of a colorimeter, there are cases where a backing board such as illustrated in "PREPARE BACKING BOARD" in FIG. 11 is provided with the colorimeter 108. In such cases, it is necessary for the colorimetric application program 106 explain how to use the backing board. However, always displaying such an explanation may be bothersome depending on the ownership of a backing board and the proficiency of the user using the backing board. Therefore, it is conceivable to provide such supplementary information in a dialog display or the like. In such a case, operation by a pointing device becomes necessary for operation of closing the dialog, which necessitates a switch between a handheld colorimeter and the pointing device, resulting in a problem that operation is cumbersome for the user.

Therefore, the third embodiment includes a feature of, in a case where operation by a pointing device is necessary due to display of a dialog or the like, the colorimetric application program 106 closing the dialog by an event from the colorimeter body 60. The basic configuration of a colorimeter, an apparatus, system, and the like and flow of processing according to the third embodiment are substantially the same as those of the aforementioned first embodiment; assume that only the differences will be described below.

FIG. 11 is a diagram illustrating an example of an operation screen displayed on a display unit 107 of the host computer 102 by the colorimetric application program 106 according to a third embodiment.

An operation screen 1100 has an area 1101 for displaying work process steps necessary for colorimetric work and a work process step content area 1102 for indicating the current work process step. In FIG. 11, the contents of the colorimetry step (Step 3) related to a feature of the third embodiment is displayed.

The area 1101 for displaying work process steps is indicated by emphasis display indicating that the current step is the colorimetry step (Step 3). The work process step content area 1102 displays a text display area 1103 related to the colorimetry step and a chart layout 1105 that is a colorimetric target. The text display area 1103 includes a supplementary information dialog display button 1104 for manually displaying supplementary information. The chart layout 1105 appropriately updates information, such as a target patch to be measured next, a patch for which colorimetry has been completed, and a patch for which colorimetry has not been completed in accordance with colorimetric work for the patches.

Further, a supplementary information dialog 1106 displaying backing board preparation information is automatically started by transitioning to the colorimetry step (Step 3). The supplementary information dialog 1106 includes a check box 1107 for setting not to display the dialog from next time. It also includes an OK button 1108 for closing the dialog with a pointing device or the like.

By using the check box 1107 for not displaying the dialog from next time, it is possible to reduce switches to the pointing device; however, since the user will then not know how to re-display the dialog, workers tend not to use the function.

Therefore, the third embodiment includes a feature of realizing both maintenance of a display information and improvement of operability by closing the dialog with a hardware button of a colorimeter while maintaining the dialog display for subsequent times. Further, it also includes a feature of preventing the number of button events from increasing by simultaneously executing an operation for closing a dialogue with a button event for measurement, which is the next action.

Figure 12:
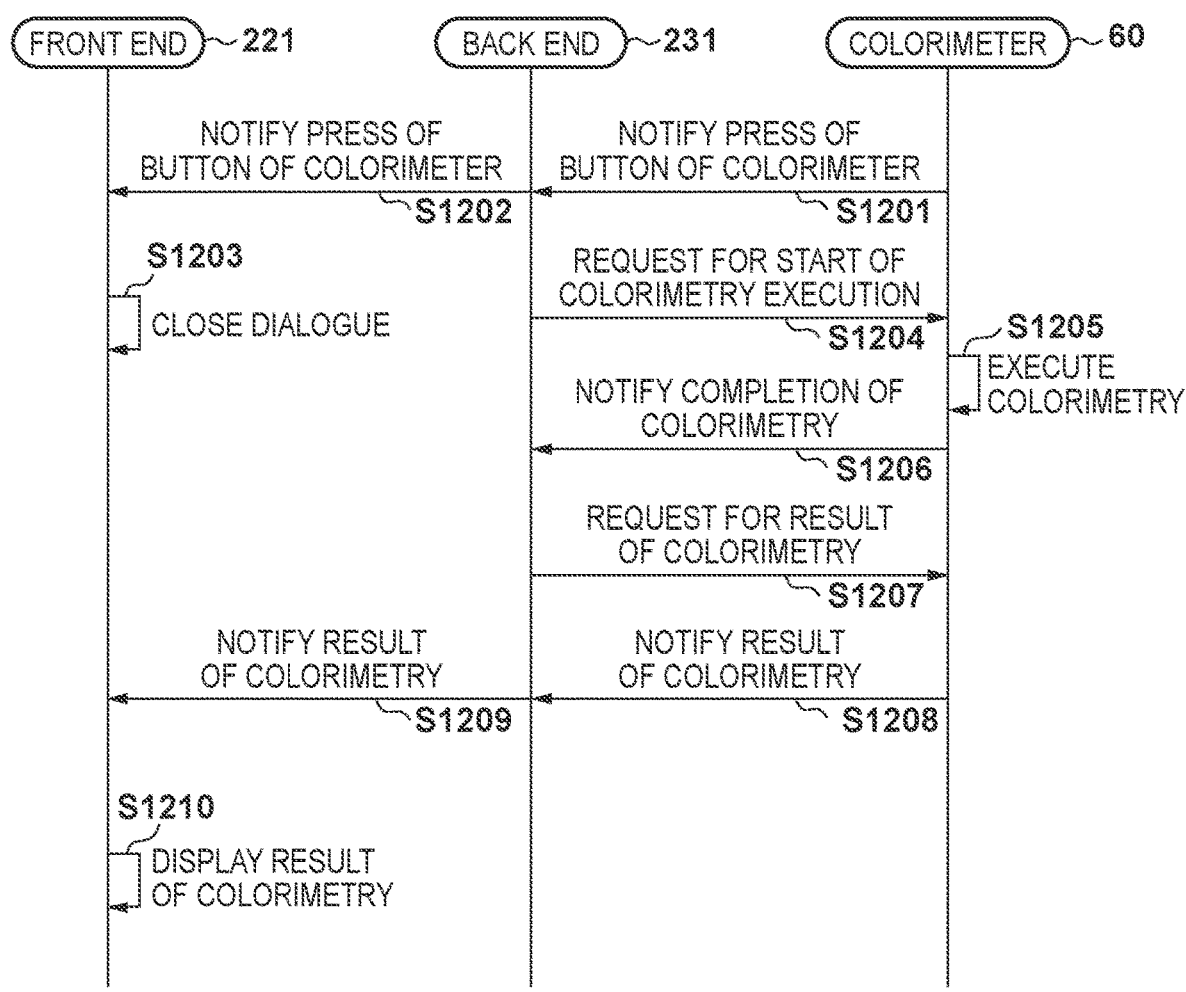
FIG. 12 is a sequence diagram for explaining a process up until a first row of patches is measured in a process of a colorimetry step by the colorimetric application program and the colorimeter body according to the third embodiment.

FIG. 12 is a sequence diagram for describing processing until a patch line of the first row is measured in processing for a colorimetry step by the colorimetric application program 106 and the colorimeter body 60 according to the third embodiment.

The processing for the front end 221 and the back end 231 of the colorimetric application program 106 illustrated in FIG. 12 is realized by being executed using the CPU 121, the ROM 122, the RAM 123, and the like of the host computer 102. Further, the processing for the colorimeter body 60 is realized by being executed by the controller 301 of the colorimeter body 60. The process prior to step S1201 is a sequence for the colorimeter preparation step sequence of FIG. 4, and the front end 221 is in a state in which it has transitioned to the colorimetry step. The back end 231 and the colorimeter body 60 are also in a colorimetry standby state.

First, when the colorimeter body 60 receives a press of the button 61 of the colorimeter body 60 by the user, in step S1201, the colorimeter body 60 in a colorimetry standby state notifies the back end 231 that the button 61 of the colorimeter has been pressed. By this, in step S1202, the back end 231 also notifies that the button 61 of the colorimeter has been pressed to the front end 221. A configuration may be taken so as to, at this time, rather than notifying the front end 221 that the button 61 of the colorimeter has been pressed, notify the front end 221 to close the dialogue being displayed.

By this, in step S1203, upon receiving a notification of a press of the button 61 of the colorimeter from the back end 231, if there is a dialog being displayed, the front end 221 controls to close the dialog.

Next, in step S1204, upon receiving a notification that the button 61 has been pressed, the back end 231 requests the colorimeter body 60 to start execution of colorimetric processing. By this, in step S1205, the CPU 302 of the colorimeter body 60 executes patch scan measurement while the user presses the button 61 and stores the measurement result of each patch in the RAM 304.

Then, in step S1206, when the CPU 302 detects that the pressing of the button 61 of the colorimeter body 60 by the user is released, that is, the user has stopped pressing the button 61, the CPU 302 notifies the back end 231 of the completion of colorimetry.

By this, in step S1207, the back end 231 requests the colorimeter body 60 for the result of colorimetry. In response to this, in step S1208, the CPU 302 of the colorimeter body 60 notifies the back end 231 of the result of colorimetry stored in the RAM 304. Then, in step S1209, the back end 231 notifies the front end 221 of the result of colorimetry received from the colorimeter body 60. Then, in step S1210, the front end 221 updates the display of the chart layout 1105 based on the result of colorimetry received from the back end 231.

Although the control for closing the dialog does not occur as there is no dialog being displayed on the front end 221 in the scan measurement for the patches of the second and subsequent rows, the same sequence is repeated until the measurement of all rows is completed.

This concludes the description for processing until a patch line of the first row is measured in processing for a colorimetry step by the colorimetric application program 106 and the colorimeter body 60 according to the third embodiment.

The present invention is not limited to the processing illustrated in the sequence of FIG. 12; it is assumed that a configuration need only accord with the spirit of the present embodiment without departing from the scope of the present invention. For example, in the sequence of FIG. 12, a single press of the button 61 of the colorimeter closes the dialogue and starts colorimetry at the same time. However, they may be performed separated into two instances of a pressing operation for closing the dialog and a pressing operation for starting colorimetry.

Further, as another step, when there is a dialog display, the dialog may be closed by operation of a button of a colorimeter. Further, a configuration may be taken so as to display a measurement complete approve button (not illustrated) for transitioning to the colorimetric completion step (Step 4) on the operation screen 500 of FIG. 5 when colorimetry of patches of all the rows is completed and enable to make a transition to the completion of colorimetry by operation of a button of a colorimeter.

It is assumed that implementation of control of the colorimetric application program 106 by a button of a colorimeter in a situation where operation for switching to a pointing device is necessary in a series of steps using the colorimeter accords with the spirit of the third embodiment. In particular, cases where control of the application program 106, such as closing a dialog or the like, is implemented at the same time as a button event, such as those at the time of colorimetry and calibration, which is essential to work performed by the colorimeter, are assumed to accord with the spirit of the third embodiment.

As described above, according to the third embodiment, a colorimetric application program can perform control, such as closing a screen for displaying supplementary information such as a dialog, by pressing a button of a colorimeter. In addition, it is possible to perform control, such as close a dialog and the like, of the colorimetric application program in the same way as a button event necessary for the work performed by the colorimeter, such as calibration and colorimetry. This makes it possible to perform work, such as close a dialogue, without operation using a pointing device, which makes it possible to reduce burden on a colorimetry worker.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-137369, filed Aug. 25, 2021 and Japanese Patent Application No. 2022-067817, filed Apr. 15, 2022, which are hereby incorporated by reference herein in their entirety.

What is claimed is:

1. An information processing apparatus operable to perform colorimetry using a colorimeter, including a button and an indicator that is lightable, configured to perform colorimetry of a colorimetric target based on reflected light obtained by applying illumination light onto the colorimetric target, the apparatus comprising:
   one or more memories storing instructions; and
   one or more processors that execute the instructions to:
      obtain a name or an identification data of the colorimeter that is connected to the information processing apparatus from the colorimeter and determine an application control program corresponding to the colorimeter;
      load the determined application control program;
      execute the determined application control program, and receive an operation event of a user operation performed on the button of the connected colorimeter; and
      in response to the received operation event of the user operation, control the information processing apparatus in accordance with the determined application control program so as to:
         confirm that the colorimeter is to be used;
         light the indicator of the colorimetric upon the colorimeter being confirmed to be used; and
         request execution of calibration of the confirmed colorimeter.

2. The information processing apparatus according to claim 1, wherein the one or more processors control the information processing apparatus so as to, in an initial operation event of the user operation, confirm that the colorimeter is to be used, and in a next operation event of the user operation, cause the confirmed colorimeter to execute the calibration and change a lighting status of the indicator according to the result of the calibration.

3. The information processing apparatus according to claim 1, wherein the one or more processors control the information processing apparatus so as to, in response to the received operation event of the user operation, confirm that the colorimeter is to be used, and cause the confirmed colorimeter to execute the calibration.

4. The information processing apparatus according to claim 1, wherein the one or more processors execute the instructions to cause an output unit of the colorimeter to output that the colorimeter has been confirmed to be used or output a state that the colorimeter is waiting for usage preparation.

5. The information processing apparatus according to claim 4, wherein the output unit performs display output or output by sound.

6. The information processing apparatus according to claim 4, wherein the one or more processors execute the instructions to cause an output unit of the information processing apparatus to output that the colorimeter has been confirmed to be used or output a state that the colorimeter is waiting for usage preparation.

7. The information processing apparatus according to claim 1, wherein, in a state where a plurality of colorimeters are connected to the information processing apparatus, the one or more processors execute the instructions to:
  determine whether the received operation event of the user operation is from a selected colorimeter, among the plurality of connected colorimeters, that is selected in the application control program;
  in a state where the received operation event of the user operation is from the selected colorimeter, confirm that the selected colorimeter is to be used;
  light an indicator of the selected colorimeter upon the selected colorimeter being confirmed to be used; and
  in a state where the received operation event is not from the selected colorimeter, switch so as to connect with a colorimeter, among the plurality of connected colorimeters, that provided the received operation event of the user operation.

8. The information processing apparatus according to claim 1, wherein:
  the one or more processors execute the instructions to display a screen displaying information of a selected colorimeter that is selected in the application control program, and
  the screen includes a dialogue displaying a description relating to a user operation of the selected colorimeter.

9. The information processing apparatus according to claim 8,
  wherein the screen further displays a button for confirming the selected colorimeter to be used.

10. The information processing apparatus according to claim 8, wherein the one or more processors execute the instructions to close the dialogue in response to a user operation event from the selected colorimeter.

11. A non-transitory computer-readable storage medium storing a program executable by for causing one or more processors of an information processing apparatus to execute a method comprising:
  obtaining a name or an identification data of the colorimeter that is connected to the information processing apparatus from the colorimeter and determining an application control program corresponding to the colorimeter;
  loading the determined application control program;
  executing the determined application control program, and receiving an operation event of a user operation performed on the button of the colorimeter;
  in response to the received operation event of the user operation confirming that the colorimeter is to be used in accordance with the application control program;
  lighting an indicator of the colorimeter upon the colorimeter being confirmed to be used; and
  requesting execution of calibration of the confirmed colorimeter.

12. The non-transitory computer-readable storage medium according to claim 11, wherein:
  the method further comprises causing a display unit to display a screen displaying information of the colorimeter, and
  the screen includes a dialogue displaying a description relating to a user operation of the colorimeter.

13. The non-transitory computer-readable storage medium according to claim 12, wherein the screen further displays a button for confirming the colorimeter to be used.

14. The non-transitory computer-readable storage medium according to claim 12, wherein the method further comprises closing the dialogue in response to an operation event of a user operation from a colorimeter that is selected in the control program.

15. The non-transitory computer-readable storage medium according to claim 11, wherein, in a state where the information processing apparatus is connected to a plurality of colorimeters, the method further comprises:
  determining whether the received operation event of the user operation is from a selected colorimeter, among the plurality of connected colorimeters, that is selected in the determined application control program;
  in a state where the received operation event of the user operation is from the selected colorimeter, confirm that the selected colorimeter is to be used; and
  in a state where the received operation event of the user operation is not from the selected colorimeter, switch so as to connect with a colorimeter, among the plurality of connected colorimeters, that provided the received operation event of the user operation.

16. A colorimeter operable to perform colorimetry on a colorimetric target based on reflected light obtained by irradiating illumination light on the colorimetric target, the colorimeter comprising:
  an operation button;
  an indicator that is lightable;
  one or more memories storing instructions; and
  one or more processors that execute the instructions to:
    notify an information processing apparatus to which the colorimeter is connected of a name or an identification data of the colorimeter, in a state where the colorimeter is connected to the information processing apparatus;
    in response to the operation button being operated by a user, notify the information processing apparatus of an operation event of a user operation;
    in response to a calibration request from the connected information processing apparatus, after the notification of the operation event of the user operation, light the indicator and execute calibration of the colorimeter; and
    control so as to notify the information processing apparatus of a result of executing calibration.

17. The colorimeter according to claim 16, wherein the one or more processors execute the instructions to output a result of the calibration.

18. The colorimeter according to claim 16, wherein the one or more processors execute the instructions to, in a state where the result of calibration is successful, cause the colorimeter to transition to a colorimetry standby state.

19. A colorimetric system comprising:
    a colorimeter, including a button and an indicator that is lightable, operable to perform colorimetry on a colorimetric target based on reflected light obtained by irradiating illumination light on the colorimetric target; and
    an information processing apparatus including one or more first memories storing a program and one or more first processors that execute the program to:
        obtain a name or an identification data of the colorimeter that is connected to the information processing apparatus from the colorimeter and determine an application control program corresponding to the colorimeter;
        load the determined application control program;
        execute the determined application control program, and receive an operation event of a user operation performed on the button of the colorimeter that is connected to the information processing apparatus;
        in response to the received operation event of the user operation, confirm that the colorimeter is to be used;
        light the indicator of the colorimetric upon the colorimeter being confirmed to be used; and
        issue a calibration request for execution of calibration of the confirmed colorimeter,
    wherein the colorimeter includes one or more second memories and one or more second processors configured to:
        in response to the operation on the button, notify the information processing apparatus of the operation event of the user operation;
        in response to the calibration request from the information processing apparatus, in response to the notification of the operation event of the user operation, execute calibration of the colorimeter; and
        notify the information processing apparatus of a result of executing the calibration.

20. A method of controlling an information processing apparatus operable to perform colorimetry using a colorimeter, including a button and an indicator that is lightable, configured to perform colorimetry on a colorimetric target based on reflected light obtained by irradiating illumination light on the colorimetric target, the method comprising:
    obtaining a name or an identification data of the colorimeter that is connected to the information processing apparatus from the colorimeter and determining an application control program corresponding to the colorimeter;
    loading the determined application control program;
    executing the determined application control program, and receiving an operation event of a user operation performed on the button of the colorimeter; and
    in response to the received operation event of the user operation, confirming that the colorimeter is to be used in accordance with the determined application control program;
    lighting the indicator of the colorimetric upon the colorimeter being confirmed to be used; and
    requesting execution of calibration of the confirmed colorimeter.

21. A method of controlling a colorimeter, including an operation button and an indicator that is lightable, operable to perform colorimetry on a colorimetric target based on reflected light obtained by irradiating illumination light on the colorimetric target, the method comprising:
    notifying an information processing apparatus to which the colorimeter is connected of a name or an identification data of the colorimeter, in a state where the colorimeter is connected to the information processing apparatus;
    in response to the operation button being operated by a user, notifying the information processing apparatus of an operation event of a user operation;
    in response to a calibration request from the information processing apparatus, after the notification of the operation event of the user operation, lighting the indicator of the colorimeter and executing calibration of the colorimeter; and
    notifying the information processing apparatus of a result of executing calibration.

* * * * *